United States Patent
Evans (10) Patent No.: US 10,305,901 B2
(45) Date of Patent: May 28, 2019

(54) SYSTEM AND METHOD FOR MULTI-FACTOR AUTHENTICATION

(71) Applicant: BlackBerry Limited, Waterloo (CA)

(72) Inventor: Adam Justin George Evans, Toronto (CA)

(73) Assignee: BlackBerry Limited, Waterloo (CA)

( * ) Notice: Subject to any disclaimer, the term of this patent is extended or adjusted under 35 U.S.C. 154(b) by 169 days.

(21) Appl. No.: 15/148,571

(22) Filed: May 6, 2016

(65) Prior Publication Data

US 2017/0324737 A1    Nov. 9, 2017

(51) Int. Cl.
*H04L 9/00* (2006.01)
*H04L 9/30* (2006.01)
*H04L 9/32* (2006.01)
*H04W 4/02* (2018.01)
*H04L 29/06* (2006.01)
*H04W 12/04* (2009.01)
*H04W 12/06* (2009.01)

(52) U.S. Cl.
CPC .......... *H04L 63/0884* (2013.01); *H04L 9/006* (2013.01); *H04L 9/30* (2013.01); *H04L 9/3263* (2013.01); *H04L 63/0272* (2013.01); *H04L 63/06* (2013.01); *H04L 63/0853* (2013.01); *H04W 12/04* (2013.01); *H04W 12/06* (2013.01); *H04L 2463/082* (2013.01); *H04W 4/02* (2013.01)

(58) Field of Classification Search
CPC ..... H04L 63/0884; H04L 9/006; H04L 63/06; H04L 9/30; H04L 63/0272; H04L 9/3263; H04W 12/04; H04W 12/06
See application file for complete search history.

(56) References Cited

U.S. PATENT DOCUMENTS

| | | | | |
|---|---|---|---|---|
| 7,310,814 | B2 * | 12/2007 | Morita | G03G 15/5091 713/164 |
| 8,689,294 | B1 * | 4/2014 | Thakur | H04L 63/08 713/182 |
| 8,775,532 | B1 * | 7/2014 | Kumar | G06Q 10/107 455/410 |
| 9,374,349 | B1 * | 6/2016 | Corlett | H04L 63/08 |
| 9,444,805 | B1 * | 9/2016 | Saylor | H04L 63/08 |
| 9,756,042 | B2 * | 9/2017 | Bicer | H04L 63/0853 |

(Continued)

FOREIGN PATENT DOCUMENTS

| | | |
|---|---|---|
| AU | 2015100350 A4 | 4/2015 |
| EP | 2929671 A1 | 10/2015 |
| WO | 2014087179 A1 | 6/2014 |

OTHER PUBLICATIONS

Jarva, Olli, "Intelligent two-factor authentication", Master's Thesis Espoo, May 13, 2014, 116 pages. (Year: 2014).*

(Continued)

*Primary Examiner* — Michael Pyzocha
(74) *Attorney, Agent, or Firm* — Moffat & Co (57) ABSTRACT

A method at an authentication server for multi-factor authentication of an electronic device, the method including receiving at the authentication server a request for authentication of the electronic device; sending information to the electronic device; receiving a response based on the information sent to the electronic device, the response further including an authentication time limit; authenticating the response; and storing the response and time limit upon verification of the response.

23 Claims, 6 Drawing Sheets

(56) References Cited

U.S. PATENT DOCUMENTS

| | | | |
|---|---|---|---|
| 2004/0019804 A1* | 1/2004 | St. Pierre | H04L 63/02 709/227 |
| 2005/0120125 A1* | 6/2005 | Morten | G06F 21/10 709/231 |
| 2005/0132203 A1* | 6/2005 | Dharmarajan | G06F 21/46 713/183 |
| 2006/0037064 A1* | 2/2006 | Jeffries | G06F 21/31 726/4 |
| 2007/0186103 A1* | 8/2007 | Randle | G06F 21/31 713/168 |
| 2008/0076395 A1* | 3/2008 | Bhatia | H04M 3/42365 455/413 |
| 2009/0133109 A1* | 5/2009 | Giles | H04L 63/08 726/7 |
| 2009/0249456 A1* | 10/2009 | Malas | G06F 21/31 726/6 |
| 2010/0100948 A1* | 4/2010 | Delia | G06F 21/31 726/6 |
| 2010/0122331 A1* | 5/2010 | Wang | G06F 21/31 726/6 |
| 2011/0277025 A1* | 11/2011 | Counterman | G06F 21/40 726/8 |
| 2012/0054841 A1* | 3/2012 | Schultz | G06F 21/44 726/6 |
| 2012/0331162 A1* | 12/2012 | Jung | H04L 63/083 709/229 |
| 2013/0117407 A1* | 5/2013 | O'Sullivan | H04L 63/10 709/217 |
| 2013/0185778 A1* | 7/2013 | Tamai | G06F 21/36 726/6 |
| 2013/0312061 A1* | 11/2013 | Casals Andreu | G06F 21/40 726/3 |
| 2013/0318581 A1* | 11/2013 | Counterman | H04W 12/06 726/7 |
| 2014/0095943 A1 | 4/2014 | Kohlenberg et al. | |
| 2014/0325684 A1* | 10/2014 | Takeyasu | H04L 63/20 726/29 |
| 2014/0337956 A1* | 11/2014 | Korgaonkar | H04W 12/06 726/9 |
| 2015/0032826 A1* | 1/2015 | Gunaratnam | H04L 51/14 709/206 |
| 2015/0039908 A1* | 2/2015 | Lee | G06F 21/35 713/193 |
| 2015/0150100 A1* | 5/2015 | Soni | H04L 63/0876 726/7 |
| 2015/0195268 A1* | 7/2015 | Fang | H04L 63/0807 726/9 |
| 2015/0215299 A1* | 7/2015 | Burch | H04L 63/08 726/5 |
| 2015/0257010 A1* | 9/2015 | Salonen | H04W 12/08 705/39 |
| 2015/0381373 A1* | 12/2015 | Camenisch | H04L 63/0823 713/158 |
| 2015/0382195 A1 | 12/2015 | Grim | |
| 2016/0087957 A1* | 3/2016 | Shah | H04L 63/205 726/1 |
| 2016/0127902 A1* | 5/2016 | Ciarniello | H04L 63/0838 380/247 |
| 2016/0323270 A1* | 11/2016 | Anand | H04L 63/0807 |
| 2016/0337353 A1* | 11/2016 | Coats | H04W 12/06 |
| 2017/0004483 A1* | 1/2017 | Runyan | G06Q 20/325 |
| 2017/0116431 A1* | 4/2017 | Lee | G06F 21/604 |
| 2017/0148264 A1* | 5/2017 | Pichette | G07F 17/3244 |
| 2017/0195457 A1* | 7/2017 | Smith, II | H04L 67/327 |
| 2017/0279795 A1* | 9/2017 | Redberg | H04L 63/0838 |
| 2017/0300476 A1* | 10/2017 | Hampson | G01C 21/3644 |
| 2017/0374070 A1* | 12/2017 | Shah | H04L 63/20 |

OTHER PUBLICATIONS

Simons, Alex, "Suspend MFA on a Remembered Device now in Preview!", Aug. 20, 2014, <https://cloudblogs.microsoft.com/enterprisemobility/2014/08/20/suspend-mfa-on-a-remembered-device-now-in-preview/>, pp. 1-9. (Year: 2014).*

Freier P Karlton Netscape Communications P Kocher Independent Consultant A, "The Secure Sockets Layer (SSL) Protocol Version 3.0; rfc6101.txt", Internet Engineering Task Force, Standard Internet Society (ISOC) 4, Rue Des Falaises Ch-1205 Geneva, Switzerland, pp. 1-67, Aug. 13, 2011.

European Patent Office, Extended European Search Report for Application No. 17169459.9, dated Jul. 4, 2017.

European Patent Office, Communication for Application No. 17 169 459.9-1218, dated Jun. 5, 2018.

* cited by examiner

SYSTEM AND METHOD FOR MULTI-FACTOR AUTHENTICATION

FIELD OF THE DISCLOSURE

The present disclosure relates to multi-factor authentication, and in particular relates to systems and methods for facilitating multi-factor authentication.

BACKGROUND

With many services and resources now available over public networks, there is an increased need to provide strong authentication for those services or resources. Strong authentication, also referred to as two-factor authentication or multi-factor authentication, is defined as validation of two or more of three possible factors of authentication.

Such factors of authentication include something you know, something you have and something that you are. For example, a password may be something that you know. A key, physical token, mobile phone or device, among other objects may be something you have. Fingerprints, retinal scans, DNA, facial characteristics, among other options, may be something that you are.

A number of strong authentication mechanisms now rely on a mobile device as the physical factor of authentication. In particular, the mobile device is "something you have".

BRIEF DESCRIPTION OF THE DRAWINGS

The present disclosure will be better understood with reference to the drawings, in which.

DETAILED DESCRIPTION OF THE DRAWINGS

The present disclosure provides a method at an authentication server for multi-factor authentication of an electronic device, the method comprising: receiving at the authentication server a request for authentication of the electronic device; sending information to the electronic device; receiving a response based on the information sent to the electronic device, the response further including an authentication time limit; authenticating the response; and storing the response and time limit upon verification of the response.

The present disclosure further provides an authentication server for multi-factor authentication of an electronic device, the authentication server comprising: a processor; and a communications subsystem, wherein the authentication server is configured to: receive server a request for authentication of the electronic device; send information to the electronic device receive a response based on the information sent to the electronic device, the response further including an authentication time limit; authenticate the response; and store the response and time limit upon verification of the response.

The present disclosure further provides a computer-readable medium comprising instructions in code which when executed by a processor of an authentication server cause the authentication server to: receive a request for authentication of an electronic device; send information to the electronic device; receive a response based on the information sent to the electronic device, the response further including an authentication time limit; authenticate the response; and store the response and time limit upon verification of the response.

The present disclosure further provides a method for multi-factor authentication of an electronic device, comprising: sending, from the electronic device to an authentication server, a request for authentication; providing, from the electronic device to an authentication server, a token signed by the electronic device along with a time limit for the authentication; and receiving a confirmation from the authentication server that authentication of the electronic device was successful.

The present disclosure further provides an electronic device configured for multi-factor authentication, the electronic device comprising: a processor; and a communications subsystem, wherein the electronic device is configured to: send, to an authentication server, a request for authentication; provide, to an authentication server, a token signed by the electronic device along with a time limit for the authentication; and receive a confirmation from the authentication server that authentication of the electronic device was successful.

The present disclosure further provides a computer-readable medium comprising instructions in code which when executed by a processor of an electronic device cause the electronic device to: send, to an authentication server, a request for authentication; provide, to an authentication server, a token signed by the electronic device along with a time limit for the authentication; and receive a confirmation from the authentication server that authentication of the electronic device was successful.

In accordance with the embodiments of the present disclosure, systems and methods are provided for performing authentication of a multi-factor authentication request for the purpose of maintaining strong authentication security when an electronic device has limited connectivity or is unavailable. The unavailability of the electronic device may prevent strong authentication from occurring. In particular, when performing strong, or two-factor, authentication using an electronic device as an authentication factor, in some scenarios the electronic device may be unavailable, disconnected or turned off. This may prevent authentication from happening on the electronic device in real-time. In such scenarios, a user may be unable to login to a resource or service that requires strong authentication Pre-authentication describes a method by which a user can authenticate using their electronic device ahead of a primary authentication request to allow the user to extend electronic device authentication for a particular period of time. Specifically, the systems and methods described herein allow a user to perform the electronic device part of the authentication ahead of time, and such authentication may last for a specific period of time during which the user is permitted to authenticate using a single factor, such as a password only.

The present disclosure is described using two-factor authentication, in which a first factor may be a credential and the second factor is based on an electronic device. However, the embodiments described herein could equally be used in any multi-factor authentication scheme in which at least one factor includes an electronic device.

Strong authentication is generally started upon an application receiving a username and password from a user. As used herein, an application is a system or program that delegates the user authentication to a strong authentication server. Examples include a virtual private network (VPN) gateway, a federated software as a service (SaaS) application, or a hosted service, among other options.

The username and password can be provided to a server and are checked for validity against an authoritative source, such as a lightweight directory access protocol (LDAP) Directory or Database as the first factor of authentication.

In other systems, instead of a username or password, other credentials or data may be provided to the authentication server. For example, a fingerprint scan may be used in place of a password.

An electronic device, such as a mobile device may be used as the second factor of authentication. An electronic device may comprise any stationary device or mobile device or other electronic device used during authentication. An electronic device can include, without limitation, a computing device, cellular telephone, smart phone, laptop, desktop computer, tablet, smart watch or other wearable device, vehicle, or any other electronic device capable of communicating over a network.

The authentication server may, for example, send a notification to the device and request a response. Often the second factor may be done utilizing a short message (SMS) message or an automated phone call, where a code is provided that may then be typed into the application. In other cases, the electronic device may be used to reply to the SMS message or to provide validation the phone call.

In still further embodiments, a notification may be sent by the authentication server to a specific application on the electronic device, where the electronic device may then provide a token back to the authentication server. For example, the token may rely on a public key infrastructure (PKI) or a shared secret for validation of the device to the authentication server. For example, a token may be generated by encrypting elements of the notification from the authentication server with a private key of the electronic device. The token may be returned automatically or after user permission, for example through a user interface on the electronic device. Once received at the server, the server may decrypt the token using the public key of the electronic device to verify authenticity of the token.

In all of the above methods, the device must be on and connected to a wireless or cellular network in order to receive the notifications.

Various situations exist where the electronic device may be unreachable by a network. In one example, an electronic device may be unavailable if the user is on an airplane. For example, many airplanes currently provide for Wi-Fi connectivity for a single device. Thus, if a user is attempting to login to a corporate site, cloud service, VPN, among other options, from a laptop while connected to an airplane Wi-Fi system, the electronic device may be unreachable because the user has only purchased a single Wi-Fi connection rather than multiple Wi-Fi connections. In this case, the user will be unable to authenticate from the laptop.

In another example, a site or workplace may be secure and not allow electronic devices. In this case, the electronic device will be unusable as a secondary authentication mechanism.

In a further example, the user may be in a location where the electronic device is out of coverage of both mobile and Wi-Fi networks. For example, the user may be in a remote location in which wired connectivity exists for a desktop computer but in which there is no Wi-Fi or cellular signal. Again, the electronic device will be unusable for the second factor of authentication.

In other cases, a battery powered electronic device may have a very weak battery and may run out of power before the user is ready to perform the strong authentication.

In all of the above situations, the unreachability of the electronic device is predictable and time limited. Therefore, in accordance with the present disclosure, a user may proactively authenticate the second factor of the multi-factor authentication using the electronic device, prior to the first factor of the multi-factor authentication. Such proactive authentication will typically be limited to a time period that the user selects or that is provided by default.

The authentication of the electronic device gives the user a specific period of time in which the user may authenticate to the application simply using the credentials for the first factor of the authentication, but does not require the second factor from the electronic device.

In some embodiments, the request for authentication of the electronic device may be manually made by a user interacting with the electronic device. In other embodiments, automatic authentication of the electronic device may occur based on information or context of the electronic device.

Figure 1:
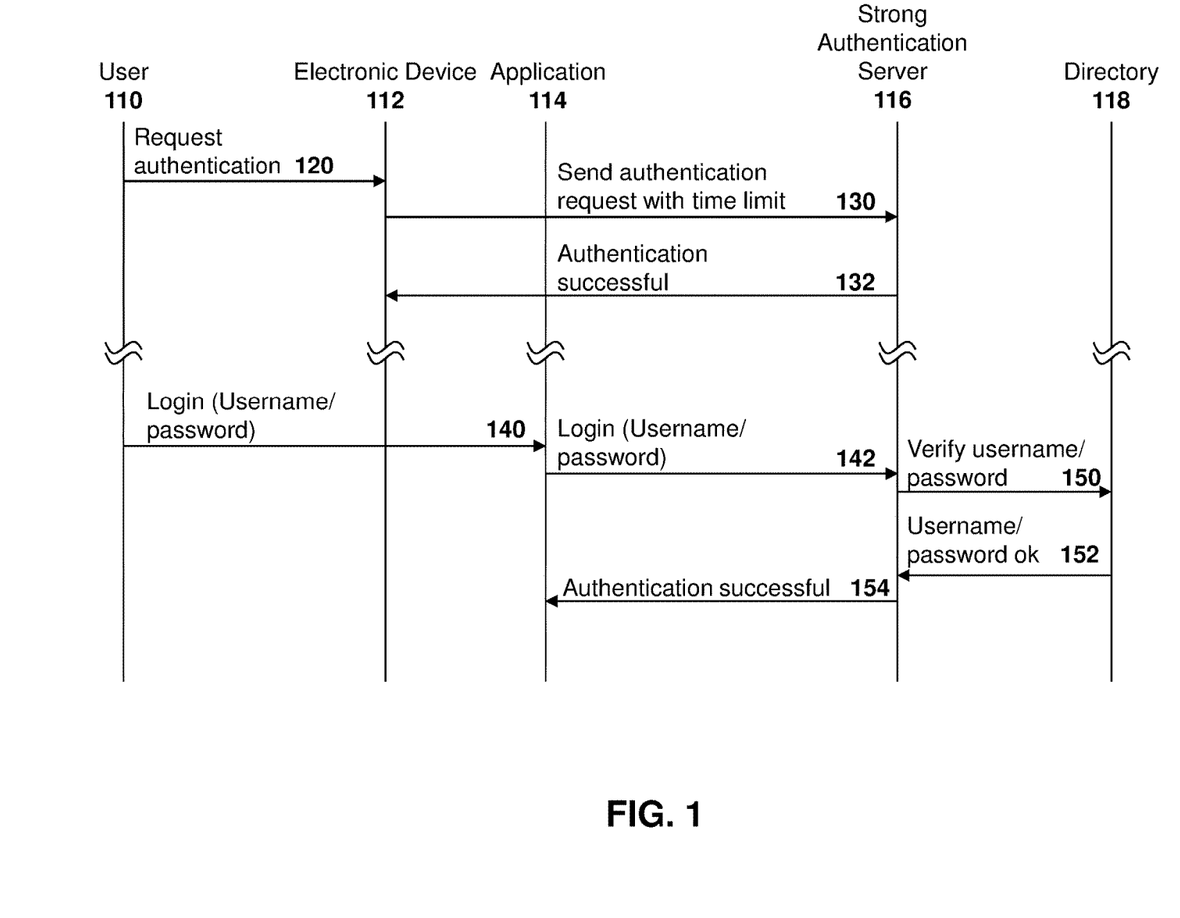
FIG. 1 is a data flow diagram showing authentication through an electronic device.

Reference is now made to FIG. 1, which is a dataflow diagram showing user initiated authentication of an electronic device in a strong authentication system. In the example of FIG. 1, a user 110 has an electronic device 112 and is further interacting with an application 114 on a computing device. The computing device may be a laptop or desktop computer, a mobile device, a tablet, or other similar device capable of communicating over a network. In one embodiment, the computing device may be the same as electronic device 112. However, in other embodiments the application 114 may be on a separate computing device. For example, the user may be utilizing a laptop computer or desktop computer to access a VPN connection utilizing application 114

In particular, as provided in FIG. 1, a user 110 communicates with electronic device 112. The user may know that the electronic device will soon be unavailable. However, the user may not currently be able to or ready to use application 114. Subsequently, when the user is ready or able to use the application, the electronic device 112 may be unavailable.

This may occur, for example, if the user is in an airport terminal and would like to connect to a company VPN during the flight. In the airport terminal, the electronic device is still connected to a network, but any connection to a company VPN on the laptop will be lost when boarding the airplane. Conversely, the laptop on the airplane can only be used once in the air, at which point the electronic device will be unavailable.

Thus, to allow connectivity during the flight, the user 110 requests authentication at electronic device 112, as shown by message 120. For example, this may occur by opening a strong authentication application on the electronic device and requesting authentication.

In some embodiments, the authentication may be for any service or resource associated with the device. In other embodiments authentication may occur for a specific or selectable service or resource. For example, the authentication application opened on the electronic device may be for a particular service or resource. In this case, a user may have to select between multiple authentication applications to open for authentication.

In still further embodiments, an authentication application may allow the selection of the service or resource. One example of a selectable menu is described below with regards to FIG. 3.

Electronic device 112 then sends the authentication request to strong authentication server 116, as shown by message 130. A strong authentication server, as used herein, is a server that performs user authentication on behalf of an application.

In the example of FIG. 1, credentials such as an electronic device token may be provided in message 130. In other embodiments, various handshaking messages or other messages may be exchanged between electronic device 112 and strong authentication server 116 prior to a token being provided. Further, in some embodiments, identification of the service or resource that strong authentication is requested for may be provided in message 130.

Once the token is received, strong authentication server 116 checks the token for the second factor in the multi-factor authentication, and if the second factor is successful then strong authentication server 116 sends an authentication successful message 132 back to electronic device 112.

Subsequently, but within a set amount of time, the user may attempt to login to application 114, and provide credentials such as a username and password, as shown by message 140.

The application may then forward the credentials to strong authentication server 116, as shown by message 142.

Strong authentication server 116 may then verify with directory 118 by sending a request to verify credentials, as shown by message 150. Directory 118 may be an LDAP server, database or other similar directory, and may be part of strong authentication server 116 in one embodiment. In other embodiments, directory 118 may be stored on a server or computing device remote from strong authentication server 116. The directory may return a positive response 152 if the authentication is valid.

Strong authentication server 116 will check to see if the user has successfully performed authentication for the service or resource, and whether the user is still within the authentication time window. If authentication exists for the electronic device, and is still valid, the authentication server 116 may then provide an authentication successful message 154 back to application 114

If the authentication of the device has not occurred or has expired, instead of message 154, strong authentication server 116 may send a message (not shown) to electronic device 112 to commence performance of the second stage of the multi-factor authentication.

In accordance with FIG. 1, if the authentication check finds that no successful authentication of the electronic device has occurred or that the authentication attempt is outside of the authentication permission window, and if the electronic device does not successfully respond to a challenge message, then the strong authentication server 116 will send an authentication unsuccessful message to application 114. Similarly, if the credentials such as the username or password are incorrect then an authentication unsuccessful message is also sent to application 114.

Figure 2:
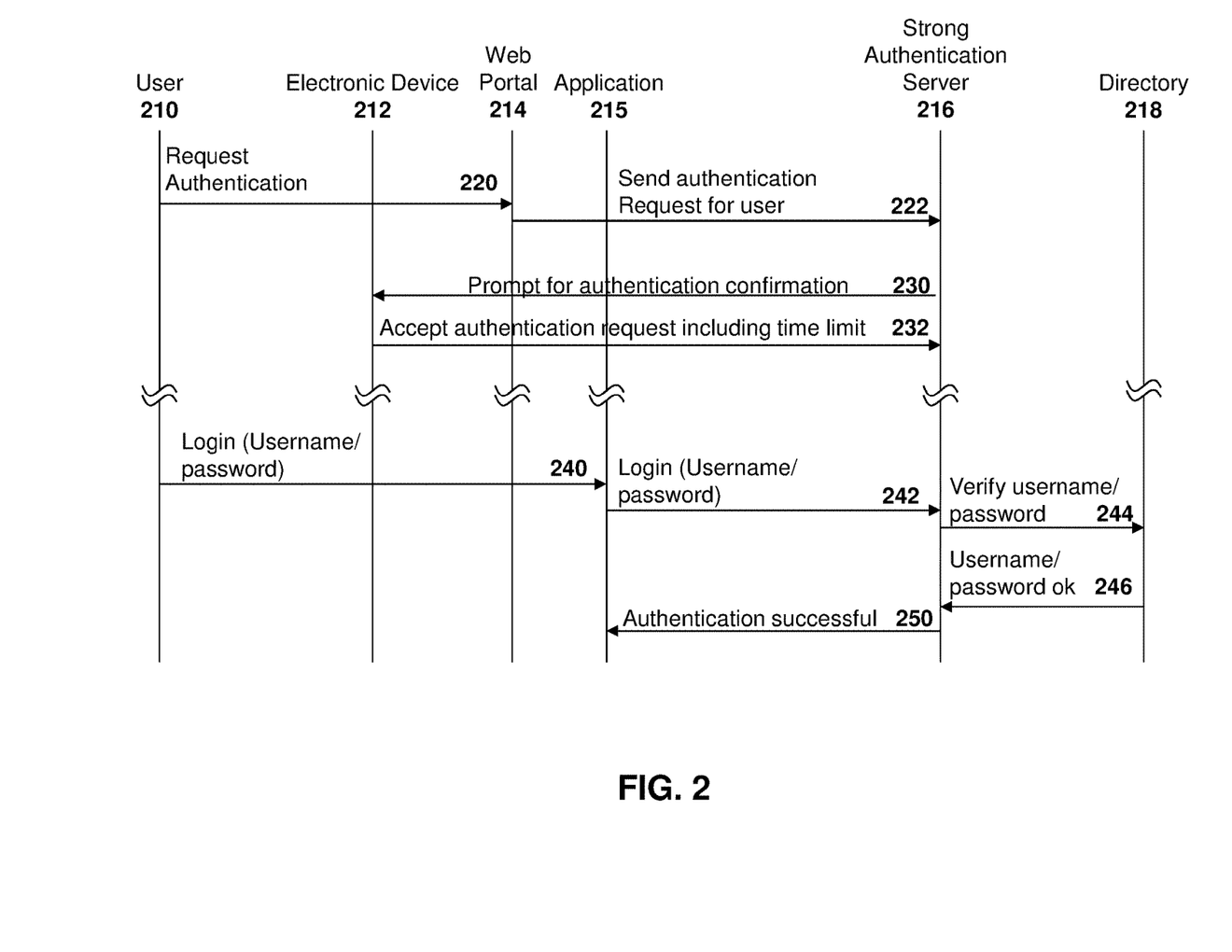
FIG. 2 is a data flow diagram showing authentication through a web portal.

In an alternative embodiment, instead of using a strong authentication application on the electronic device, a user may log into a web portal in order to start the authentication process for the electronic device, service or resource. Reference is now made to FIG. 2.

As seen in FIG. 2, a user 210 has an electronic device 212 that is used for the second factor in a multi-factor authentication system. Unlike in FIG. 1 which the user utilized an electronic device to start the authentication process, in the embodiment of FIG. 2, user 210 logs into a web portal 214 in order to initiate the authentication process for the electronic device. In some embodiments, user 210 may enter certain credentials into web portal 214 in order to begin the authentication process. In some embodiments, the user may select a particular service or resource that authentication is being requested for. The request to initiate the authentication process is shown by message 220.

Once web portal 214 is satisfied with the authenticity of the request, web portal 214 may then send a request to the strong authentication server 216 to perform authentication for the user 210. Such request is shown in the embodiment of FIG. 2 with message 222.

Authentication server 216 will then proceed to request authentication from electronic device 212. Thus, in the example of FIG. 2, authentication server 216 sends message 230 to electronic device 212 prompting for authentication confirmation.

Electronic device may then, in certain embodiments, provide a response 232 back to authentication server 216. For example, response 232 may include a message encrypted with a PKI certificate or a shared secret between electronic device 212 and authentication server 216.

Prior to sending message 232, the electronic device may prompt a user using the electronic device on whether the authentication attempt should be accepted. This would ensure that the user has agreed to the authentication, and that the login using the web portal is valid.

In other embodiments, a user may set the device to automatically respond to message 232 under certain conditions. For example, if the user is attempting to login to a service or resource using a laptop that the electronic device can sense through short range communication mechanisms such as Bluetooth™, then the electronic device may automatically respond to message 232. In this case, message 230 may need to provide information about the computing device that is attempting to access the service or resource for verification at the electronic device.

In an alternative embodiment, message 230 may be an SMS message with a code. User 210 may then enter the code into the web portal 214 to provide for authentication. In this case, web portal 214 would communicate the entered code to authentication server 216 in order to provide for authentication.

In still a further embodiment, message 230 may be a phone call such as an automated phone call in which a message or code is communicated to user 210 through electronic device 212. Again such code may be entered through electronic device 212 or web portal 214.

As described below, message 232 may further include a time limit for the authentication of the electronic device.

Authentication server 216 checks message 232 and if the information within the message is verified then authentication server 216 stores the authentication information along with a time limit for subsequent login attempts.

In the example of FIG. 2, once the user 210 is ready to perform authentication with a service requiring strong authentication, the user may login to an application 215, as shown by message 240. Such login may, for example, include credentials such as a username or password.

The application 215 may then provide the login credentials to authentication server 216, as shown by message 242.

Authentication server 216 then may send the credentials to a directory 218 to verify the credentials, as shown by message 244.

If the credentials are valid, directory 218 may provide a message 246 back to authentication server 216 indicating that the credentials are valid.

Authentication server 216 checks to see whether or not authentication of the electronic device has successfully been performed and that the login attempt is within a set time limit. If the authentication of the electronic device has expired or has not occurred at all then after message 248 is received at authentication server 216, the process then proceeds to perform the second factor authentication by sending a challenge (not shown) to electronic device 212. The electronic device 212 would then need to authenticate with authentication server in order to allow a user access to a service or resource.

Conversely, if authentication of the electronic device was proactively performed and the time limit has not yet expired, authentication server 216 may provide an authentication successful message 250 to application 215.

As with the embodiment of FIG. 1, if authentication is not successful then message 250 may indicate authentication failure and the user may in some cases be entitled to try again.

In the embodiments of FIGS. 1 and 2 above, the time limit during which the proactive authentication of the electronic device remains valid may be pre-set or may be set by a user. For example, a resource or service may specify a maximum time that the proactive authentication for the electronic device is valid for. This maximum time may be used as the default. Alternatively, a user may specify a time limit that authentication of the electronic device is valid for. For example, such time limit may be specified in messages 130 or 232 from FIG. 1 or 2. The time limit may be configurable up to a maximum value accepted by the service or resource.

Figure 3:
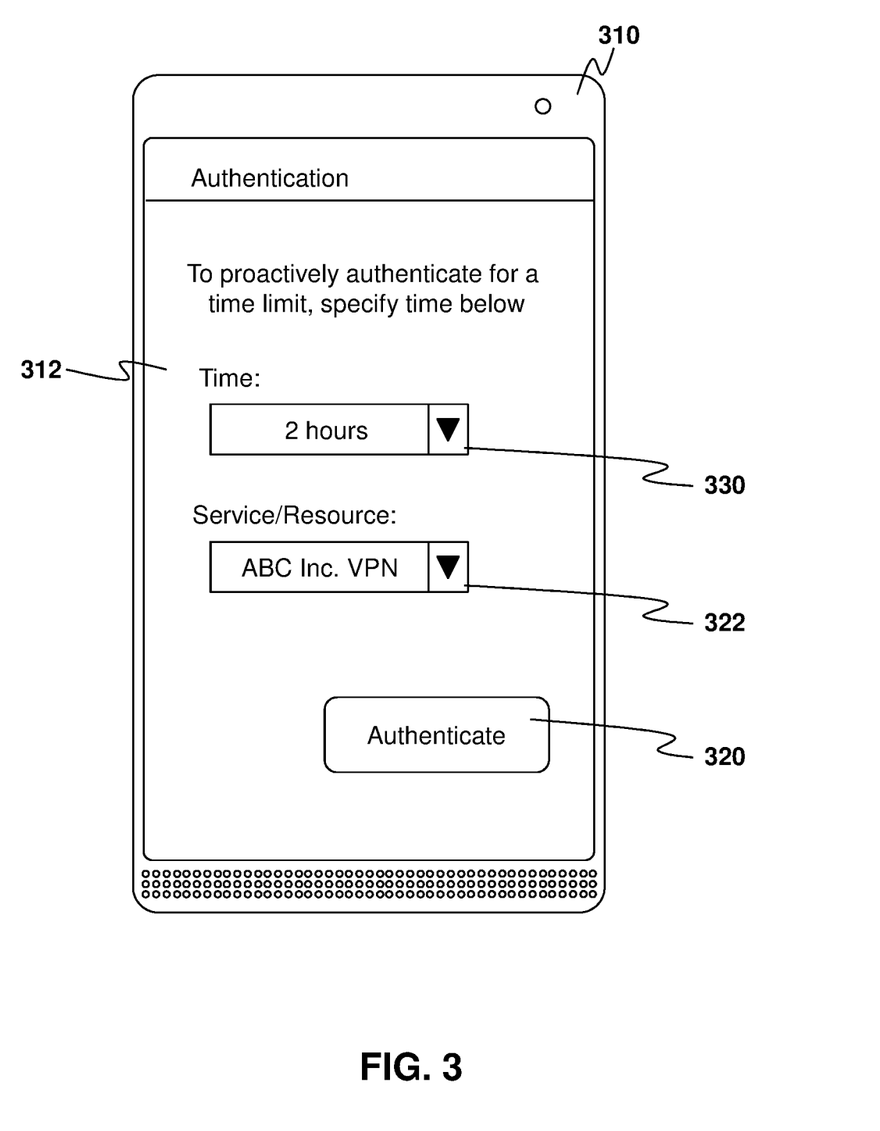
FIG. 3 is an example user interface for setting a time limit for authentication validity.

Reference is now made to FIG. 3, which shows a user interface display for authentication at the electronic device. In particular, a user may authenticate using a strong authentication application on the electronic device. In this case, electronic device 310 includes a display 312 which has the strong authentication application displayed. The strong authentication application may give a user an option to authenticate, such as for example through the selection of a button 320.

Further, an optional selection box 322 may allow the user to select the service or resource for which authentication is desired. If used, the authentication would only be valid for the service or resource selected in box 322.

In some embodiments, the user may be prompted to enter a time within which the authentication is valid. Thus, in the embodiment of FIG. 3, display 312 shows an authentication setting screen in which the user may select the amount of time that the authentication is valid for. For example, if a user is getting onto a three-hour flight then the user may select authentication of the electronic device for 3 hours or 3½ hours. Thus a time setting box 330 allows for a user to authenticate for a certain period of time. The box may be a text input box, a drop down selection, a graphical selection, among other options.

The selection may be constrained by a maximum amount of time. Thus, for example, if the system or service that the user is trying to login to allows for proactive authentication only for 3 hours, then the selection in box 330 may be limited to 3 hours at the upper limit.

In some embodiments, the setting at box 330 may also be limited by a lower limit. For example, authentication may be valid for a minimum amount of time in order to avoid the system resources required to constantly authenticate. Thus, for example, an authentication may be valid for at least 10 minutes.

In some embodiments, in order to secure authentication from the electronic device, credentials may be required to be entered for verification prior to the sending of the authentication request. Such credentials may be local, including the device password, or external, including a directory user identity and password, for example. Thus, in the embodiment of FIG. 3, if a user presses button 320 and prompt may appear asking the user to enter credentials.

Other options and variations are possible.

In still a further embodiment, the device may be configured to automatically authenticate based on device context or information. For example, in one embodiment, the device may mine the calendar of a user in order to determine when the device may be unavailable for communication. Thus, if a calendar event says "flight" or "flying" then the device may infer that it will not have a network connection and may automatically perform authentication for a duration of the calendar event. The authentication may occur at a predetermined time threshold prior to the start of the event. For example, if the calendar event says that the flight starts at 10:00 am, the authentication may occur at 9:45 am in order to ensure that the device has not been turned off or become unavailable prior to the authentication occurring.

In other embodiments, the device may use its location in order to determine when authentication should occur. Thus, if a device determines that it is at an airport it may determine that the device may be unavailable soon and may therefore perform an authentication. Similarly, if a device is near a facility that historically has no connectivity it may authenticate. Further, if the device is losing signal strength on a network and has no new network to transfer to then it may perform authentication prior to losing the cellular signal. Other options are possible.

Figure 4:
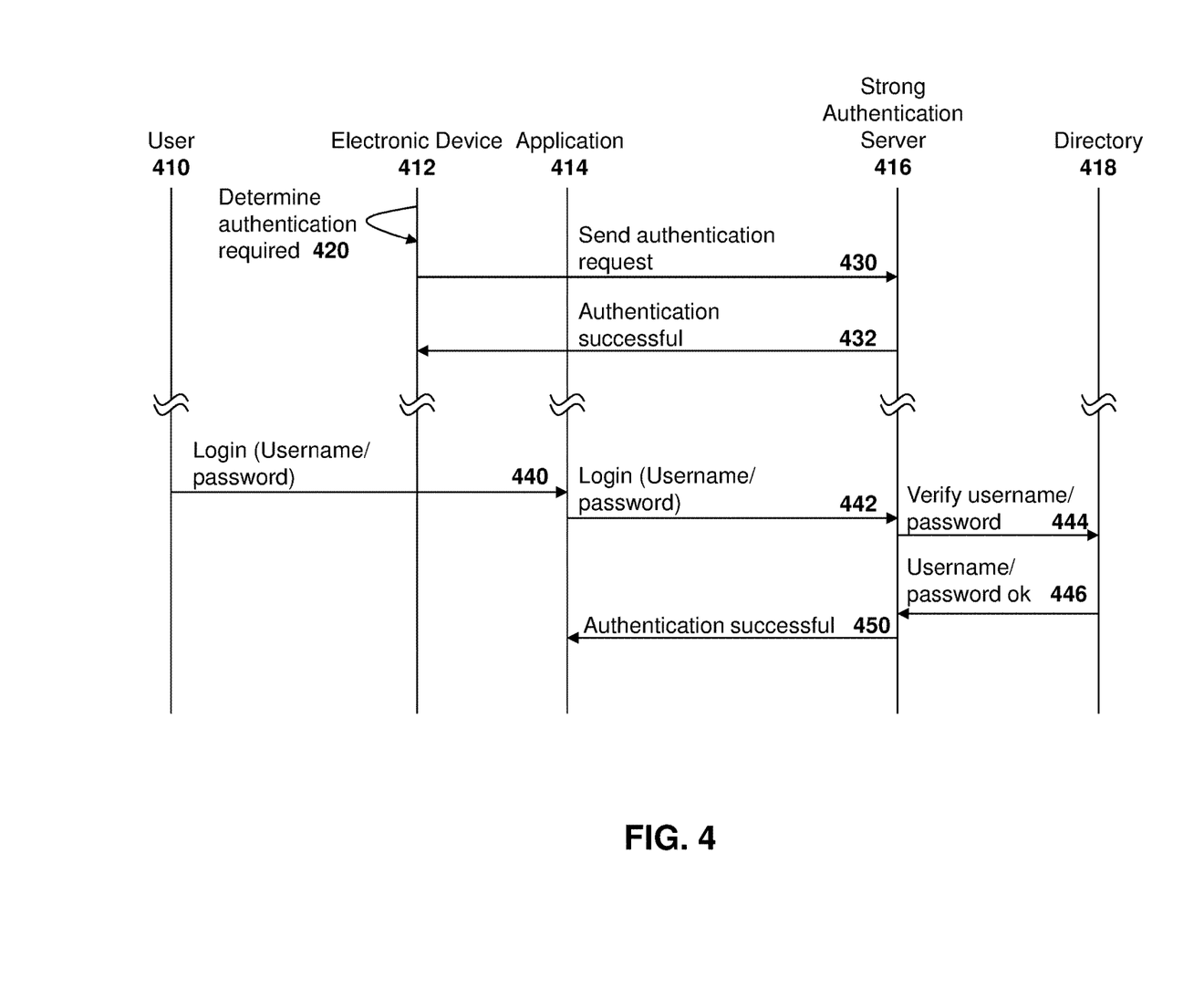
FIG. 4 is a data flow diagram showing authentication based on device information or context.

Reference is now made to FIG. 4. In the embodiment of FIG. 4, an electronic device 412 communicates with an authentication server 416. As seen in the embodiment of FIG. 4, a device may perform a check 420, for a context or information on the device to determine whether authentication should occur. The check 420 can, for example, include mining the user's calendar or e-mails for events, determining the location of the device, determining whether the device is about to go out of cellular coverage or Wi-Fi coverage and thus about to lose connectivity, among other options.

If check 420 determines that the electronic device may become unavailable in the near future and therefore that authentication is required, the device may request authentication from the authentication server 416 prior to the device being unavailable. Thus, as seen in the example of FIG. 4, electronic device 412 may send an authentication request 430 to authentication server 416.

Server 416 may then perform the authentication for the second stage of the multi-factor authentication. For example, message 430 may contain a token. Further, message 430 may involve several communications between electronic device 412 and authentication server 416, including a challenge from the authentication server and a response from electronic device 412.

Once authentication server 416 verifies electronic device 412 it may send a message 432 indicating success back to electronic device 412.

The electronic device is then authenticated for a certain amount of time. In some cases, the time period may be set by default on electronic device 412 or server 416. In other cases, prior to sending message 430 the device may prompt a user by indicating that authentication is about to occur and ask what time period the user would like to set. In other cases, the time may be based on information mined from the calendar or email of a user, including duration of flight information or duration of meeting information at a secure facility, among other options.

The user then may, during the authentication time period, login to an application 414. Thus, as shown in the embodiment of FIG. 4, the user 410 sends login credentials to application 414 in message 440. The login credentials may then be provided to authentication server 416 as shown by message 442.

Authentication server 416 may then provide the credentials to a directory 418 in message 444 and if the credentials are verified then directory 418 may provide that the credentials are valid in message 446 back to authentication server 416.

Authentication server 416 may then check to determine whether the second factor of authentication has previously occurred and if so, whether or not the login attempt is within the time limit set during the authentication. If yes, then both factors of the strong authentication mechanism have been satisfied and authentication server 416 may send an authentication successful message back to application 414, as shown by message 450 in the embodiment of FIG. 4.

If authentication using the electronic device has not occurred or if the time period set for the second factor of the authentication has expired, the strong authentication server 416 may send a challenge message to electronic device 412 and may continue with the second factor of the authentication.

The above therefore allows for a device to be authenticated for a specific time period with a strong authentication server as the second factor of authentication, prior to the first factor having occurred. The second factor of authentication is done when it is known the electronic device will be unavailable for a time period. During the second factor proactive authentication period, single factor authentication is accepted by the authentication server from an application, allowing a user to use a service or resource.

The above embodiments may be implemented on any device. For example, one simplified device is illustrated with regards to FIG. 5. The device of FIG. 5 is a simplified version of any computing device, electronic device, or server described above.

Figure 5:
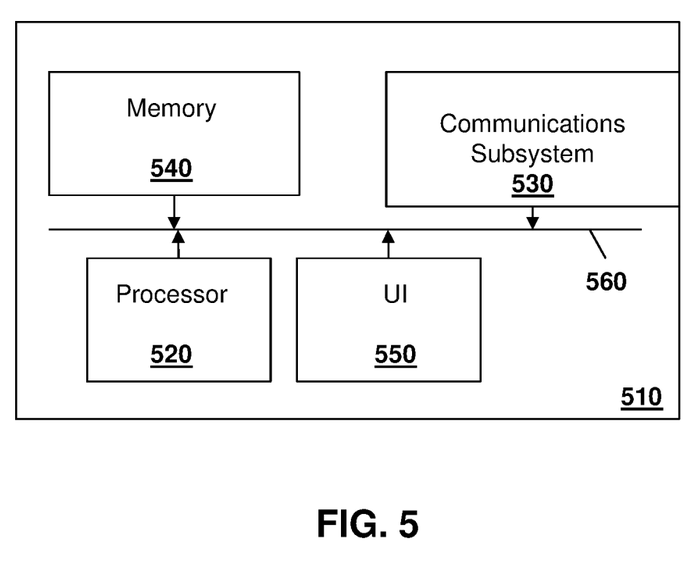
FIG. 5 is a block diagram showing a simplified computing device or server.

In FIG. 5, device 510 includes a processor 520 and a communications subsystem 530, where the processor 520 and communications subsystem 530 cooperate to perform the methods of the embodiments described above.

Processor 520 is configured to execute programmable logic, which may be stored, along with data, on device 510, and shown in the example of FIG. 5 as memory 540. Memory 540 can be any tangible, non-transitory, storage medium.

Alternatively, or in addition to memory 540, device 510 may access data or programmable logic from an external storage medium, for example through communications subsystem 530.

Communications subsystem 530 allows device 510 to communicate with other devices or network elements.

A user interface, which may include a display and input means, is provided as UI 550.

Communications between the various elements of network element 510 may be through an internal bus 560 in one embodiment. However, other forms of communication are possible.

In one embodiment, device 510 may be a mobile device. Any mobile device could be used to implement the embodiments above. One example mobile device is shown with regards to FIG. 6.

Figure 6:
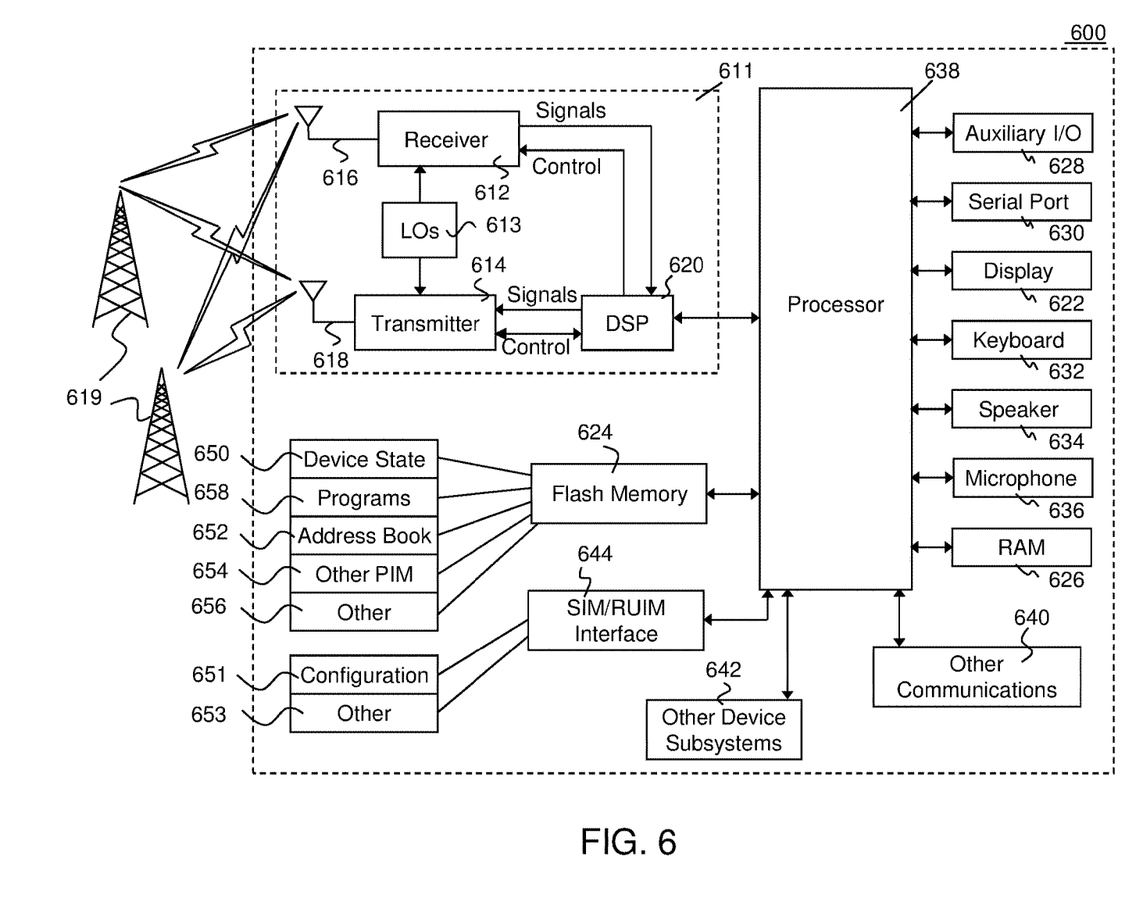
FIG. 6 is a block diagram of an example mobile device capable of being used with the embodiments described herein.

Mobile device 600 may be a two-way wireless communication device having voice and data communication capabilities. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 600 is enabled for two-way communication, it may incorporate a communication subsystem 611, including both a receiver 612 and a transmitter 614, as well as associated components such as one or more antenna elements 616 and 618, local oscillators (LOs) 613, and a processing module such as a digital signal processor (DSP) 620. Although not shown, communication subsystem 611 may include additional components. For example, UE 600 may comprise multiple receivers 612 and/or transmitters 614 to allow for simultaneous radio activity. In addition, as will be apparent to those skilled in the field of communications, the particular design of the communication subsystem 611 will be dependent upon the communication network in which the device is intended to operate.

Network access requirements will also vary depending upon the type of network 619. In some networks network access is associated with a subscriber or user of mobile device 600. A mobile device may require one or more smart cards which can contain different applications such as a USIM, RUIM or a SIM application in order to operate on a network. The smart card interface 644 is normally similar to a card-slot into which a smart card can be inserted and ejected. The smart card can have memory and hold many key configurations 651, and other information 653 such as identification, and subscriber related information.

When required network registration or activation procedures have been completed, mobile device 600 may send and receive communication signals over the network 619. As illustrated in FIG. 6, network 619 can consist of multiple base stations communicating with the mobile device.

Signals received by antenna 616 through communication network 619 are input to receiver 612, which may perform such common receiver functions as signal amplification, frequency down conversion, filtering, channel selection and the like. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Processor 638, in addition to its operating system functions, may enable execution of software applications on the mobile device. A predetermined set of applications that control basic operations, including at least data and voice communication applications for example, will normally be installed on mobile device 600 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape), flash drive, hard drive, or other memory known in the art.

One software application may be a secure authentication application as described above.

In a data communication mode, a received signal such as a text message or web page download will be processed by the communication subsystem 611 and input to the processor 638, which may further process the received signal for output to the display 622, or alternatively to an auxiliary I/O device 628.

A user of mobile device 600 may also compose data items such as email messages for example, using the keyboard 632, which may be a complete alphanumeric keyboard or telephone-type keypad, in conjunction with the display 622 and possibly an auxiliary I/O device 628. In other embodiments display 622 may be touch sensitive and keyboard 632 may be virtual. Such composed items may then be transmitted over a communication network through the communication subsystem 611.

For voice communications, overall operation of mobile device 600 is similar, except that received signals would typically be output to a speaker 634 and signals for transmission would be generated by a microphone 636. Alternative voice or audio I/O subsystems, such as a voice message recording subsystem, may also be implemented on mobile device 600. Although voice or audio signal output is generally accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the UE to a computer to act as a modem or to a wall outlet or computer as a charging source.

Other communications subsystems 640, such as a short-range communications subsystem, is a further optional component which may provide for communication between mobile device 600 and different systems or devices, which need not necessarily be similar devices. For example, the subsystem 640 may include an infrared device and associated circuits and components or a Bluetooth™ communication module to provide for communication with similarly enabled systems and devices. Subsystem 640 may further include non-cellular communications such as Wi-Fi or WiMAX. Subsystem 640 may further include sensors including accelerometers, cameras, among others.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at an authentication server for multi-factor authentication of a user of an electronic device, wherein the multi-factor authentication comprises a first authentication of the electronic device and a second authentication based on a further authentication factor associated with the user, the method comprising:
receiving at the authentication server a request for authentication of the electronic device;
receiving an authentication time limit from the electronic device;

in response to receiving the request for authentication of the electronic device, authenticating the electronic device; and storing the authentication time limit upon authenticating the electronic device to allows subsequent completion of the multi-factor authentication by completing the second authentication within the authentication time limit.

2. The method of claim 1, further comprising:

receiving, at the authentication server, credentials from an application on a computing device, the credentials being associated with a user of the electronic device;

authenticating the credentials;

upon authenticating the credentials, confirming that authentication of the electronic device has occurred and that the time limit has not expired, and upon confirming, granting access to a service or resource for the application.

3. The method of claim 2, wherein the confirming further checks that the authentication of the electronic device is done for the application on the computing device.

4. The method of claim 1, wherein the received response is a token signed by the electronic device.

5. The method of claim 1, wherein the received response is a code from the information sent to the electronic device.

6. The method of claim 1, wherein the received response is a telephone verification by the electronic device.

7. The method of claim 1, further comprising checking whether the authentication time limit received at the authentication server does not exceed a maximum threshold.

8. The method of claim 1, wherein the request is received from the electronic device.

9. The method of claim 1, wherein the request is received from a web portal.

10. An authentication server for multi-factor authentication of a user of an electronic device, wherein the multi-factor authentication comprises a first authentication of the electronic device and a second authentication based on a further authentication factor associated with the user, the authentication server comprising:

a processor;
a memory, operatively coupled to the processor; and
a communications subsystem, wherein the authentication server is configured to:

receive a request for authentication of the electronic device;

receive an authentication time limit from the electronic device;

in response to receiving the request for authentication of the electronic device, authenticating the electronic device; and store the authentication time limit upon authenticating the electronic device to allow subsequent completion of the multi-factor authentication by completing the second authentication within the authentication time limit.

11. A non-transitory computer-readable medium comprising instructions in code which when executed by a processor of an authentication server cause the authentication server to:

receive a request for authentication of an electronic device;

receive an authentication time limit from the electronic device;

in response to receiving the request for authentication of the electronic device, authenticating the electronic device; and store the authentication time limit upon authenticating the electronic device to allow subsequent completion of the multi-factor authentication by completing the second authentication within the authentication time limit.

12. A method for multi-factor authentication of an electronic device, the method comprising:

sending, from the electronic device to an authentication server, a request for authentication;

providing, from the electronic device to an authentication server, a token signed by the electronic device along with a time limit for the authentication; and receiving a confirmation from the authentication server that authentication of the electronic device was successful;

wherein the authentication of the electronic device allows an application on a computing device to access a service or resource if the application provides credentials associated with a user of the electronic device to the authentication server prior to the expiration of the time limit.

13. The method of claim 12, wherein the sending is based on a user interface selection.

14. The method of claim 13, wherein the user interface selection includes a time limit selection.

15. The method of claim 13, wherein the user interface selection includes a service or resource for authentication.

16. The method of claim 12, wherein the sending is based on parsing calendar entries or email messages on the electronic device to determine when the electronic device will become unavailable for communication.

17. The method of claim 16, wherein the time limit is determined based on the parsing.

18. The method of claim 16, wherein the sending is performed a threshold period prior to the electronic device becoming unavailable for communication.

19. The method of claim 12, wherein the sending is based on a current location of the electronic device.

20. The method of claim 19, wherein the sending is further based on historical data that communication to the electronic device becomes unavailable for communication in a specific location.

21. The method of claim 12, wherein the sending is based on a signal strength of a communications signal at the electronic device falling below a threshold and no alternative communications signals being available.

22. An electronic device configured for multi-factor authentication, the electronic device comprising:

a processor;
a memory, operatively coupled to the processor; and
a communications subsystem, wherein the electronic device is configured to:

send, to an authentication server, a request for authentication;

provide, to an authentication server, a token signed by the electronic device along with a time limit for the authentication; and receive a confirmation from the authentication server that authentication of the electronic device was successful;

wherein the authentication of the electronic device is allows an application on a computing device to access a service or resource if the application provides credentials associated with a user of the electronic device to the authentication server prior to the expiration of the time limit.

23. A non-transitory computer-readable medium comprising instructions in code which when executed by a processor of an electronic device cause the electronic device to:

send, to an authentication server, a request for authentication;
provide, to an authentication server, a token signed by the electronic device along with a time limit for the authentication; and
receive a confirmation from the authentication server that authentication of the electronic device was successful;
wherein the authentication of the electronic device is allows an application on a computing device to access a service or resource if the application provides credentials associated with a user of the electronic device to the authentication server prior to the expiration of the time limit.

* * * * *